(12) United States Patent
Aridome et al.

(10) Patent No.: US 7,609,295 B2
(45) Date of Patent: Oct. 27, 2009

(54) IMAGE PROCESSING APPARATUS WITH EASY SWITCHING BETWEEN PLAYBACK AND STILL AND MOVING IMAGE MODES

(75) Inventors: Kenichiro Aridome, Kanagawa (JP); Shinya Kano, Chiba (JP)

(73) Assignee: Sony Corporation (JP)

( * ) Notice: Subject to any disclaimer, the term of this patent is extended or adjusted under 35 U.S.C. 154(b) by 335 days.

(21) Appl. No.: 11/489,970

(22) Filed: Jul. 20, 2006

(65) Prior Publication Data

US 2007/0053565 A1    Mar. 8, 2007

(30) Foreign Application Priority Data

Jul. 20, 2005    (JP)    ............................ P2005-209682

(51) Int. Cl.
- H04N 5/225    (2006.01)
- H04N 5/76    (2006.01)
- H04N 5/00    (2006.01)
- G06K 9/00    (2006.01)

(52) U.S. Cl. ................. 348/220.1; 348/231.2; 386/120; 382/128

(58) Field of Classification Search ............... 348/220.1, 348/372, 207.99, 231.2; 386/120
See application file for complete search history.

(56) References Cited

U.S. PATENT DOCUMENTS

| 7,489,348 B2* | 2/2009 | Okada et al. ............. 348/231.2 |
| 2003/0123859 A1* | 7/2003 | Ikeda ......................... 386/120 |
| 2004/0051807 A1* | 3/2004 | Niwa .......................... 348/372 |
| 2005/0157178 A1* | 7/2005 | Miyata ................. 348/207.99 |
| 2006/0051070 A1* | 3/2006 | Itsukaichi .................... 386/117 |

FOREIGN PATENT DOCUMENTS

| JP | 2001-111958 A | 4/2001 |
| JP | 2001111958 A * | 4/2001 |

* cited by examiner

Primary Examiner—Lin Ye
Assistant Examiner—Mekonnen Dagnew
(74) Attorney, Agent, or Firm—Lerner, David, Littenberg, Krumholz & Mentlik, LLP

(57) ABSTRACT

An image processing apparatus which processes image data includes a plurality of modes of operation for processing the image data; and a first manipulating member which is manipulated during a first one of the modes of operation, wherein in the first mode of operation, a process is run which is run in the first mode of operation when the first manipulating member is manipulated; and in a second one of the modes of operation, the mode of operation is changed to the first mode when the first manipulating member is manipulated.

3 Claims, 9 Drawing Sheets

IMAGE PROCESSING APPARATUS WITH EASY SWITCHING BETWEEN PLAYBACK AND STILL AND MOVING IMAGE MODES

CROSS-REFERENCE TO RELATED APPLICATIONS

The present application claims priority from Japanese Patent Application No. JP 2005-209682 filed on Jul. 20, 2005, the disclosure of which is hereby incorporated by reference herein.

BACKGROUND OF THE INVENTION

1. Field of the Invention

The present invention relates to an image processing apparatus, an image processing method, and a program, particularly to an image processing apparatus which has a plurality of modes such as a mode of recording a moving image, a mode of recording a still image, and a mode of playing back the moving image or the still image and which is preferable for use in transition between those modes, and an image processing method, and a program.

2. Description of the Related Art

Digital still cameras and digital the video cameras are generally widely available. Generally, the digital still camera is an apparatus which takes and records a still image, and the digital the video camera is an apparatus which takes and records a moving image. In recent years, even though an apparatus is classified in the digital still camera, such an apparatus becomes widely available that can take and record a moving image. In addition, similarly, even though an apparatus is classified in the digital the video camera, such an apparatus becomes widely available that can take and record a still image.

As described above, such an apparatus becomes widely available that can take and record a still image and a moving image by a single device (hereinafter, properly referred to as a digital camera). In addition, in the digital camera like this, such a function is generally provided that can take and play back a recorded still image or a moving image.

As described above, in the digital cameras having a still image shooting mode, a moving image shooting mode, and a playback mode, the cameras often have a switch shown in FIGS. 1A and 1B, for example, for switching the modes (for example, see JP-A-2001-111958).

A switch 11 shown in FIG. 1A is configured to be slidable downward in the drawing by a user and to be returnable to the original position after slid. A video camera having the switch 11 like this is configured to switch the modes at every time when the switch 11 is manipulated. Lamps 12-1 to 12-3 are disposed near the switch 11, the lamps show a user which mode is set (in FIG. 1A, on the right side of the switch 11 in the drawing).

The lamps 12-1 to 12-3 are often configured of a light emitting device such as an LED (Light Emitting Diode), and are configured to light the lamp for the mode in accordance with a manipulation of the switch 11. For example, in the example shown in FIG. 1A, it is shown that the mode is in the moving image mode when the lamp 12-1 illuminates, it is shown that the mode is in the still image mode when the lamp 12-2 illuminates, and it is shown that the mode is in the playback mode when the lamp 12-3 illuminates. When any of the lamps 12-1 to 12-3 do not illuminate, it is shown that the power source of the video camera is off.

When the switch 11 is slid downward at one time in the state in which the power source of the video camera is off, the mode is turned to the moving image mode. When the mode is turned to the moving image mode, the lamp 12-1 illuminates. When the switch 11 is further manipulated in the moving image mode, the mode is changed to the still image mode, the lamp 12-1 goes out, and the lamp 12-2 illuminates.

As described above, in accordance with the number of manipulations of the switch 11, the modes are changed from the power source off to the moving image mode, from the moving image mode to the still image mode, from the still image mode to the playback mode, and from the playback mode to the power source off.

As described above, the video camera is configured to change the modes in accordance with the number of manipulations of the switch 11. In addition, similarly, also in a video camera which is configured to change the modes, the camera sometimes has a different switch. For example, there is also a video camera which has a switch 13 shown in FIG. 1B.

The switch 13 shown in FIG. 1B is configured to slidable downward in the drawing in which the mode of the video camera is set to the mode corresponding to the position of a slide destination (at which the switch 13 is positioned). More specifically, the switch 13 shown in FIG. 1B is configured to slide step by step. For example, when the switch 13 is slid downward at one step, the mode is turned to the moving image mode.

When the switch 13 is further slid downward at one step from the moving image mode, the mode is turned to the still image mode. When the switch 13 is further slid downward at one step from the still image mode, the mode is turned to the playback mode. The switch 13 is also configured to be slidable upward (it is returnable to the original position). For example, the switch 13 is configured in which when the switch 13 is slid upward as it is positioned at the position of the moving image mode, the mode is changed to the power source off.

As described above, there is also a video camera which is configured to change the modes in accordance with the positions of the switch 13.

The video cameras in recent years are reducing in size. Therefore, the switches 11 and 13 shown in FIGS. 1A and 1B are configured in small size, and characters denoting the modes such as "moving image" are also denoted in small characters. In addition, when the lamps 12-1 to 12-3 as shown in FIG. 1A are provided, these lamps are also configured in small size.

A user sees the representation of the lamps 12-1 to 12-3 and the modes in small size, and determines which mode is set. However, since they are small and difficult to see, a user might make a wrong decision. For example, the video camera is in the still image mode (for example, in FIG. 1A, the lamp 12-2 illuminates) but a user may not make a decision correctly which lamp illuminates. Thus, the user might make a wrong decision that the mode is set in the moving image mode.

Such case might happen that a user desires to take a scene in moving images but the user makes a wrong decision to record the scene in a still image, for example. The user might fail to take moving images and a still image that the user desires to take.

In addition, when a user happens to meet a scene that the user desires to take as the mode is in the playback mode, the user has to manipulate the switch 11 (or the switch 13) to switch the mode and then the user begins to shoot. As described above, in switching the mode, a user might select a wrong mode. In addition, even though a user selects a mode correctly, the user might fail to take the scene that the user desires to take because of the time necessary to switch the mode.

The invention has been made in view of the circumstances. It is desired to allow easy mode switching.

SUMMARY OF THE INVENTION

An image processing apparatus according to an embodiment of the invention has a moving image shooting mode of operation for taking a moving image, a still image shooting mode of operation for taking a still image, and a playback mode of operation for playing back a moving image or a still image, the apparatus including a first manipulation module which is manipulated when a moving image is taken; a second manipulation module which is manipulated when a still image is taken; a moving image shooting module which starts taking a moving image if the image processing apparatus is in the moving image shooting mode of operation when the first manipulation module is manipulated; a moving image shooting mode transition module which changes the mode of operation to the moving image shooting mode that can start taking a moving image by the moving image shooting module if the image processing apparatus is in the still image shooting mode of operation or the playback mode of operation when the first manipulation module is manipulated; a still image shooting module which starts taking a still image if the image processing apparatus is in the still image shooting mode of operation when the second manipulation module is manipulated; and a still image shooting mode transition module which changes the mode of operation to the still image shooting mode that can start taking a still image by the still image shooting module if the image processing apparatus is in the moving image shooting mode of operation or the playback mode of operation when the second manipulation module is manipulated.

The first manipulation module and the second manipulation module may be disposed at different positions.

A third manipulation module may be further provided at a position different from the positions of the first manipulation module and the second manipulation module, the third manipulation module being manipulated to switch the moving image shooting mode of operation, the still image shooting mode of operation, and the playback mode of operation.

In addition, an image processing method or a program according an embodiment of the invention is an image processing method or a program of an image processing apparatus having a moving image shooting mode of operation for taking a moving image, a still image shooting mode of operation for taking a still image, and a playback mode of operation for playing back a moving image or a still image, including taking a moving image if the image processing apparatus is in the moving image shooting mode of operation when a first manipulation module is manipulated, the first manipulation module being manipulated when the moving image is taken; changing the mode of operation to the moving image shooting mode that can start taking a moving image if the image processing apparatus is in the still image shooting mode of operation or the playback mode of operation when the first manipulation module is manipulated; taking a still image if the image processing apparatus is in the still image shooting mode of operation when a second manipulation module is manipulated, the second manipulation module being manipulated when the still image is taken; and changing the mode of operation to the still image shooting mode that can start taking a still image if the image processing apparatus is in the moving image shooting mode of operation or the playback mode of operation when the second manipulation module is manipulated.

According to an embodiment of the invention, even though a mode of operation different from the mode of operation desired by a user is set such as the moving image shooting mode, the still image shooting mode, or the playback mode, the user manipulates the manipulation module corresponding to the mode of operation desired by the user to change the mode of operation to the mode desired by the user.

An image processing apparatus according to an embodiment of the invention processes image data, the apparatus including a plurality of modes of operation for processing the image data; and a first manipulating member which is manipulated during a first one of the modes of operation, wherein in the first mode of operation, a process is run which is run in the first mode of operation when the first manipulating member is manipulated; and in a second one of the modes of operation, the mode of operation is changed to the first mode when the first manipulating member is manipulated.

The first mode of operation may be a mode to record the image data, and the second mode of operation may be a mode of playing back the image data.

The plurality of the modes of operation may further include a third mode which may record image data different from the image data recorded in the first mode of operation.

A manipulating member which is manipulated in the first mode of operation and a manipulating member which is manipulated in the third mode of operation may be disposed at different positions.

The first mode of operation may be a still image shooting mode for taking a still image, the third mode of operation may be a moving image shooting mode for taking a moving image, and the second mode of operation may be a playback mode for playing back a moving image or a still image.

The image data may be image data of a moving image or image data of a still image, the first manipulating member may include a first manipulating device which is manipulated when the moving image is taken and a second manipulating device which is manipulated when the still image is taken, and the first manipulating device and the second manipulating device may be disposed at different positions.

The plurality of the modes of operation may include a moving image shooting mode when a moving image is taken, a still image shooting mode when a still image is taken, and a playback mode of playing back the moving image or the still image.

An image processing method or a program according an embodiment of the invention is an image processing method or a program of an image processing apparatus having a plurality of modes of operation to process image data, including running a process in a first one of the modes of operation which is run in the first mode of operation when a first manipulating member is manipulated, the manipulating member being manipulated in the first mode of operation; and in a second one of the modes of operation, changing the mode of operation to the first mode when the first manipulating member is manipulated.

According to an embodiment of the invention, when the mode of operation is set in a mode different from the mode of operation desired by a user, the user manipulates the member corresponding to the mode of operation desired by the user, and thus the mode of operation is changed to the mode desired by the user.

According to an embodiment of the invention, a user can change modes of operation in an apparatus having a plurality of modes of operation with no manipulation failure.

BRIEF DESCRIPTION OF THE DRAWINGS

The teachings of the invention can be readily understood by considering the following detailed description in conjunction with the accompanying drawings, in which.

DETAILED DESCRIPTION

Hereinafter, an embodiment of the invention will be described. The following are examples of the correspondence between configuration requirements for the invention and the embodiments of the detailed description of the invention. This is described for confirming that the embodiments supporting the invention are described in the detailed description of the invention. Therefore, even though there is an embodiment that is described in the detailed description of the invention but is not described herein as an embodiment corresponding to configuration requirements for the invention, it does not mean that the embodiment does not correspond to those configuration requirements. Contrary to this, even though an embodiment is described herein as an embodiment corresponding to configuration requirements, it does not mean that the embodiment does not correspond to configuration requirements other than those configuration requirements.

Figure 6:
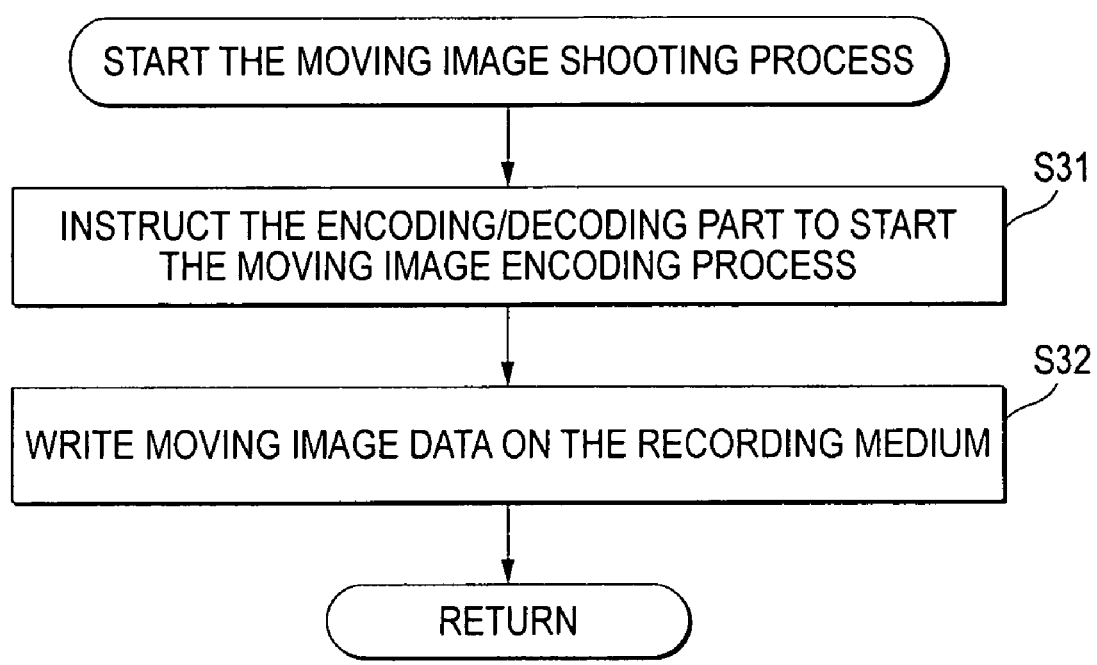
FIG. 6 shows a flow chart illustrative of the detail of a process at Step S14.
Figure 7:
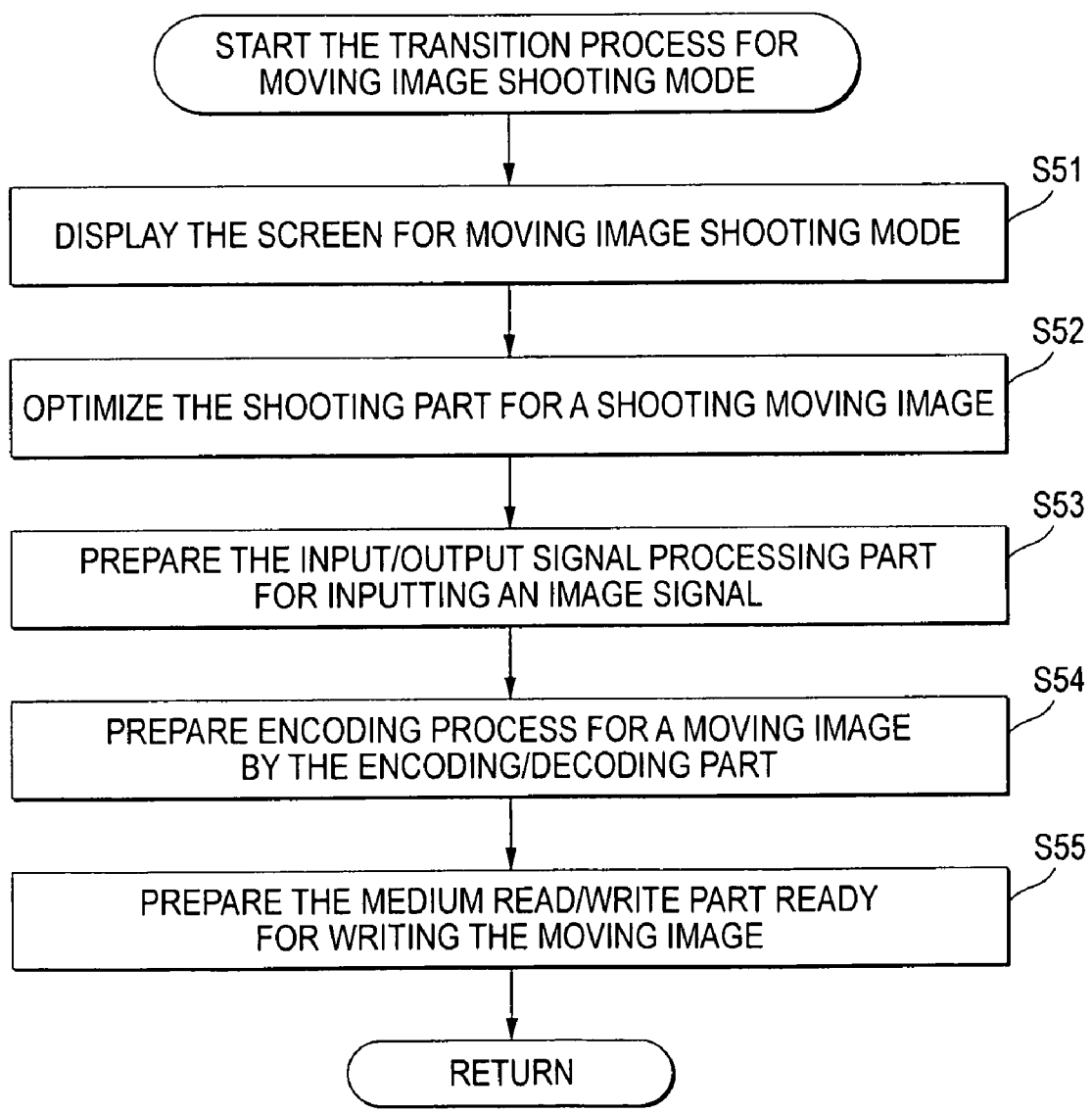
FIG. 7 shows a flow chart illustrative of the detail of a process at Step S15.
Figure 8:
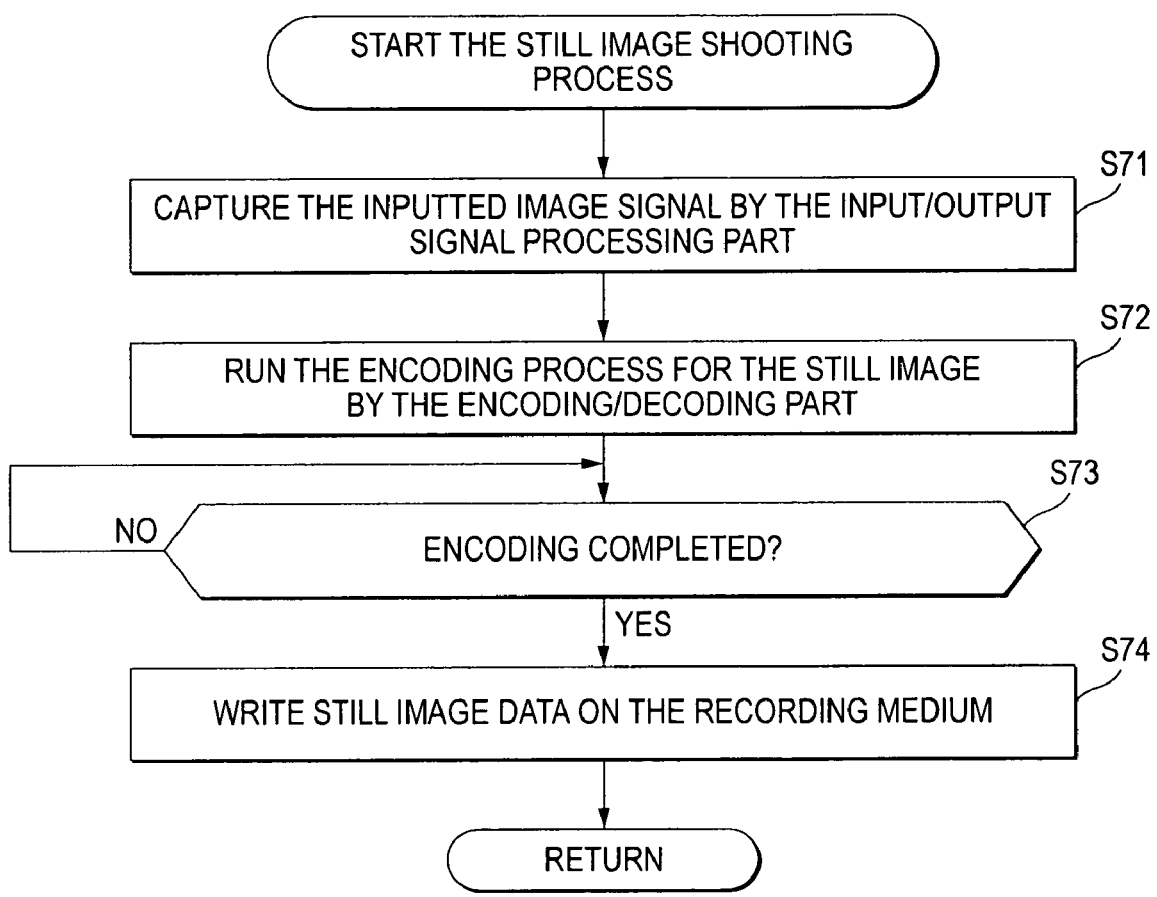
FIG. 8 shows a flow chart illustrative of the detail of a process at Step S17.

An image processing apparatus according to an embodiment of the invention is an image processing apparatus (for example, an image processing apparatus 11 shown in FIG. 2) having a moving image shooting mode of taking a moving image, a still image shooting mode of taking a still image, and a playback mode of playing back a moving image or a still image, the apparatus including: a first manipulation module (for example, a moving image shoot button 22 shown in FIG. 2) which is manipulated when a moving image is taken; a second manipulation module (for example, a still image shoot button 23) which is manipulated when a still image is taken; a moving image shooting module (for example, an image processing apparatus 11 shown in FIG. 3 which runs a process shown in a flow chart in FIG. 6) which starts taking the moving image when a mode is in the moving image shooting mode at the time when the first manipulation module is manipulated; a moving image shooting mode transition module (for example, the image processing apparatus 11 shown in FIG. 3 which runs a process shown in a flow chart in FIG. 7) which changes a mode to the moving image shooting mode that can start taking an image by the moving image shooting module when the mode is in the still image shooting mode or the playback mode at the time when the first manipulation module is manipulated; a still image shooting module (for example, the image processing apparatus 11 shown in FIG. 3) which runs a process shown in a flow chart in FIG. 8) which starts taking the still image when a mode is in the still image shooting mode at the time when the second manipulation module is manipulated; and a still image shooting mode transition module (for example, the image processing apparatus 11 shown in FIG. 3 which runs a process shown in a flow chart in FIG. 9) which changes a mode to the still image shooting mode that can start taking an image by the still image shooting module when the mode is in the moving image shooting mode or the playback mode at the time when the second manipulation module is manipulated.

A third manipulation module (for example, a switch 21 shown in FIG. 2) is further disposed at a position different from the positions of the first manipulation module and the second manipulation module, the third manipulation module is manipulated in switching the moving image shooting mode, the still image shooting mode, and the playback mode.

An image processing method or a program according an embodiment of the invention is an image processing method or a program of an image processing apparatus having a moving image shooting mode of taking a moving image, a still image shooting mode of taking a still image, and a playback mode of playing back a moving image or a still image, including: a moving image shooting step (for example, a process shown in a flow chart in FIG. 6) which starts taking the moving image when a mode is in the moving image shooting mode at the time when a first manipulation module is manipulated, the first manipulation module which is manipulated when the moving image is taken; a moving image shooting mode transition step (for example, a process shown in a flow chart in FIG. 7) which changes a mode to the moving image shooting mode that can start taking an image by a process of the moving image shooting step when the mode is in the still image shooting mode or the playback mode at the time when the first manipulation module is manipulated; a still image shooting step (for example, a process shown in a flow chart in FIG. 8) which starts taking the still image when a mode is in the still image shooting mode at the time when a second manipulation module is manipulated, the second manipulation module which is manipulated when the still image is taken; and a still image shooting mode transition step (for example, a process shown in a flow chart in FIG. 9) which changes a mode to the still image shooting mode that can start taking an image by a process of the still image shooting step when the mode is in the moving image shooting mode or the playback mode at the time when the second manipulation module is manipulated.

Figure 3:
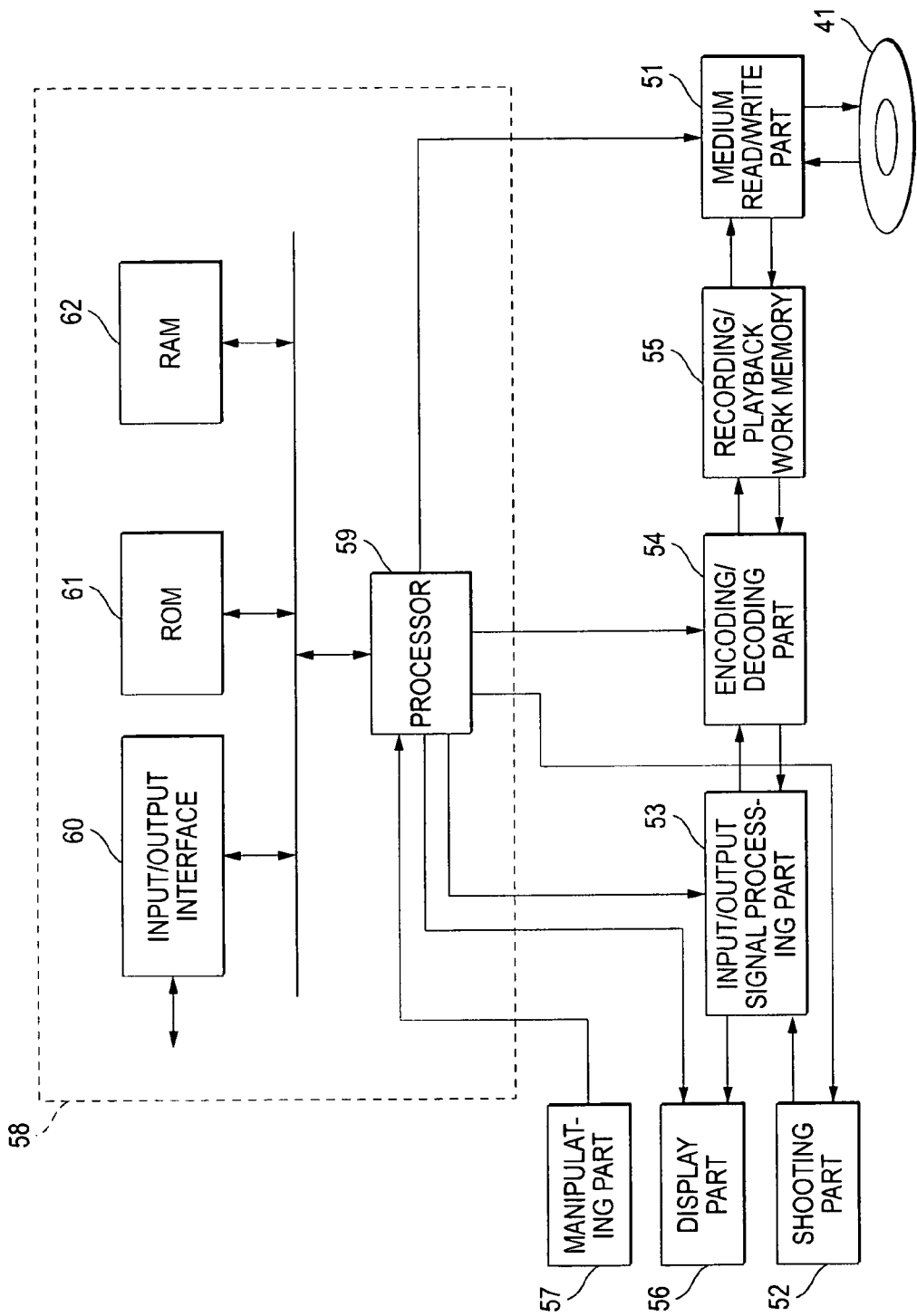
FIG. 3 shows a diagram depicting an exemplary internal configuration of the image processing apparatus.
Figure 9:
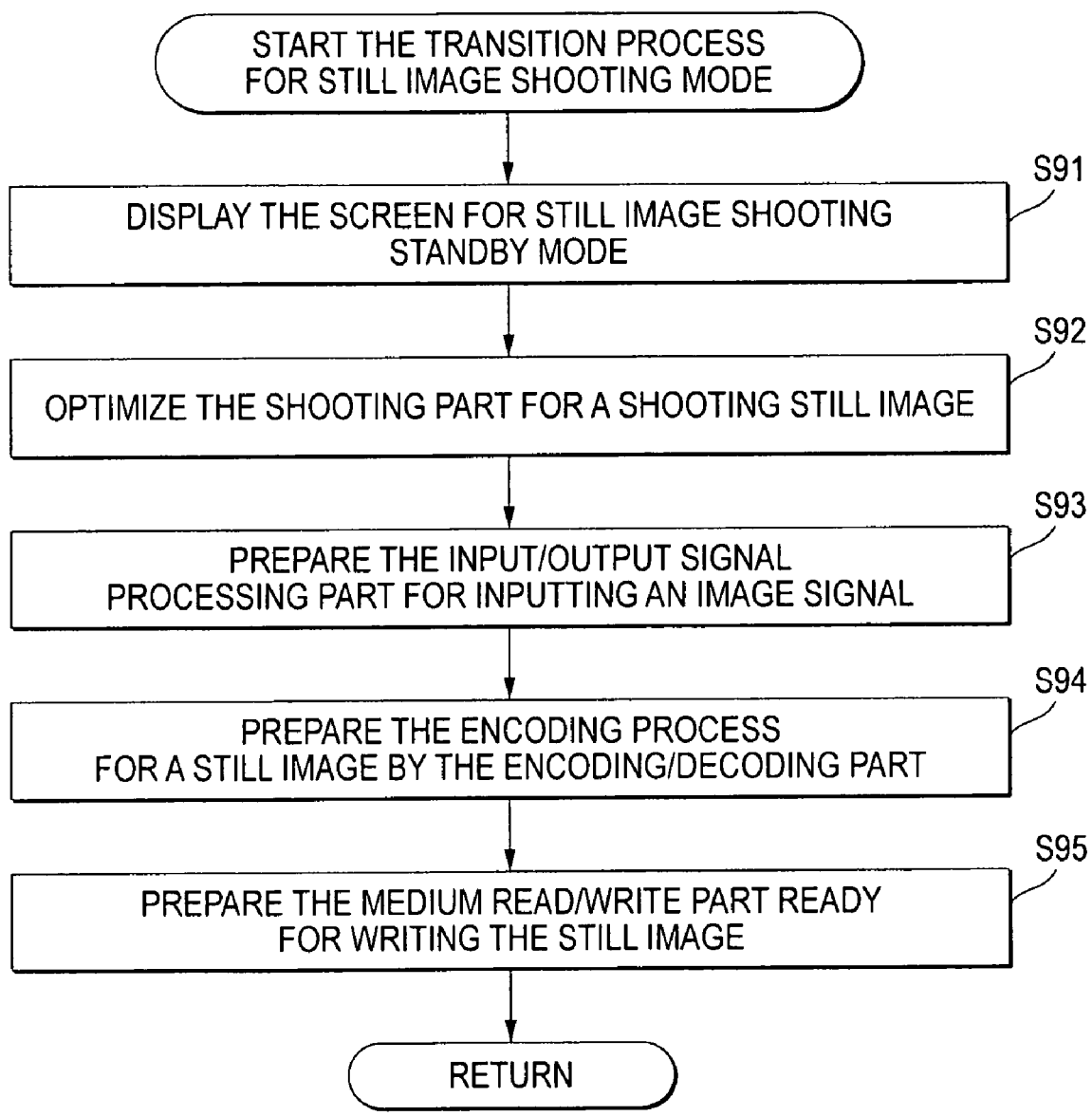
FIG. 9 shows a flow chart illustrative of the detail of a process at Step S18.

An image processing apparatus according to an embodiment of the invention is an image processing apparatus (for example, the image processing apparatus 11 shown in FIG. 3) which processes image data, the apparatus including: a plurality of modes to process the image data, wherein in a first mode in the plurality of the modes, a process is run which is run in the first mode when a manipulating member is manipulated, the manipulating member is manipulated in the first mode (for example, the image processing apparatus 11 shown in FIG. 3 which runs the process shown in the flow chart in FIG. 6 or 8); and in a second mode in the plurality of the modes, the mode is changed to the first mode when the manipulating member is manipulated, the manipulating member is manipulated in the first mode (for example, the image processing apparatus 11 shown in FIG. 3 which runs the process shown in the flow chart in FIG. 7 or 9).

An image processing method or a program according an embodiment of the invention is an image processing method or a program of an image processing apparatus which processes image data, including: a plurality of modes to process the image data, wherein in a first mode in the plurality of the modes, a process is run which is run in the first mode when a manipulating member is manipulated, the manipulating member is manipulated in the first mode (for example, the process shown in the flow chart in FIG. 6 or 8); and in a second mode in the plurality of the modes, the mode is changed to the first mode when the manipulating member is manipulated, the manipulating member is manipulated in the first mode (for example, the process shown in the flow chart in FIG. 7 or 9).

Hereinafter, an embodiment of the invention will be described with reference to the drawings.

Exemplary Configuration of the Image Processing Apparatus

Figure 2:
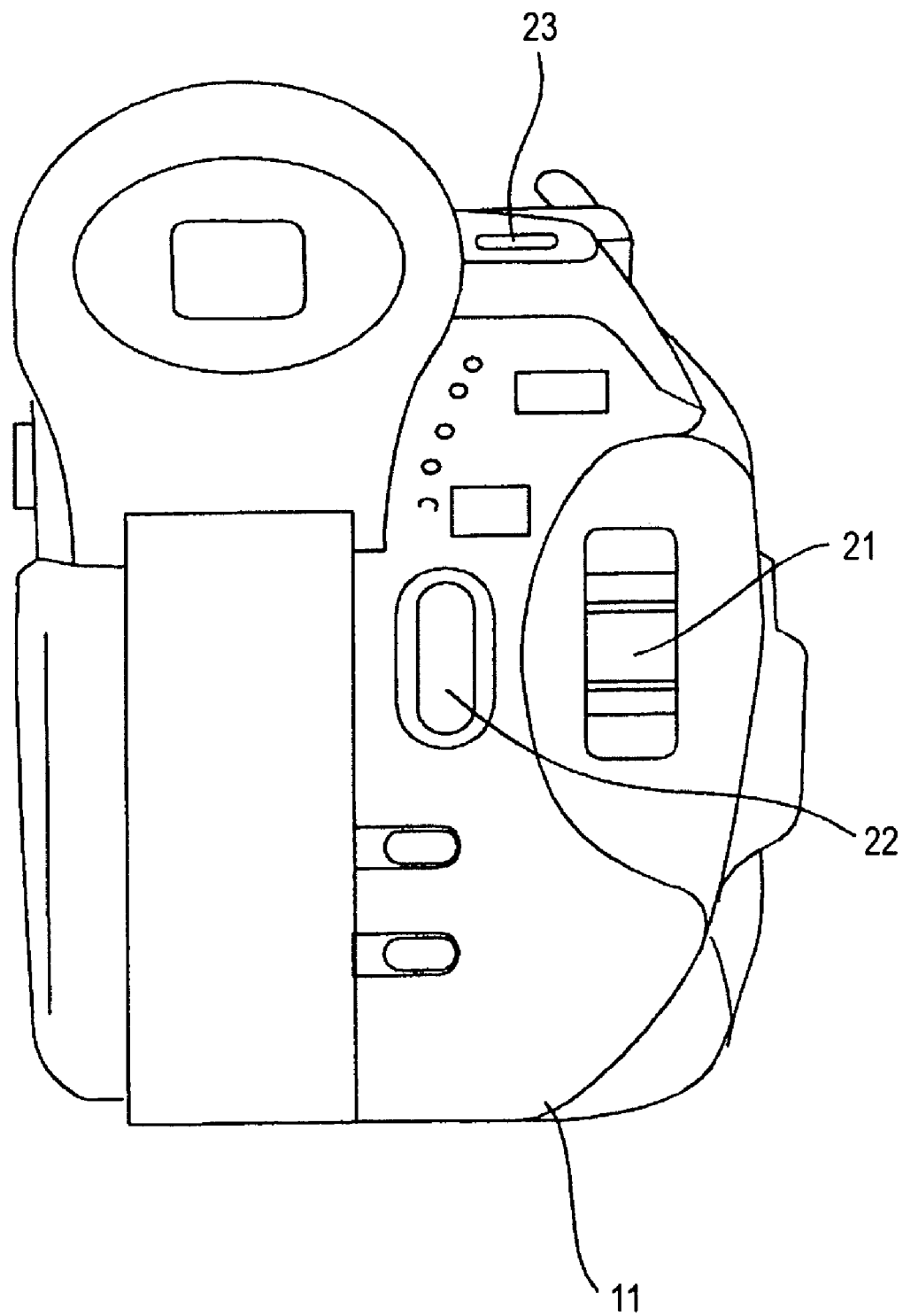
FIG. 2 shows a diagram depicting the appearance configuration of an embodiment of an image processing apparatus according to an embodiment of the invention.

FIG. 2 shows a diagram depicting the appearance configuration of an embodiment of an image processing apparatus to which an embodiment of the invention is applied. An image processing apparatus 11 shown in FIG. 2 has functions that take and record a still image and a moving image. In addition, it also has function that can play back a recorded still image and a moving image. The appearance configuration of the image processing apparatus 11 shown in FIG. 2 shows the back side of the image processing apparatus 11 (the side that is usually faced to the user side when a user takes a moving image or a still image).

The image processing apparatus 11 has a switch 21 which switches the following modes: a mode of taking an moving image (hereinafter, properly referred to as a moving image shooting mode), a mode of taking a still image (hereinafter, properly referred to as a still image shooting mode), and a mode of playing back a recorded moving image or still image (hereinafter, properly referred to as a playback mode).

A state in which the image processing apparatus 11 is set to any one of the modes is a state in which a power source is on. The switch 21 is also manipulated when the power source of the image processing apparatus 11 is switched between on and off. For example, the switch 21 can be configured the same as the switch 11 shown in FIG. 1A.

The image processing apparatus 11 separately has a button manipulated when a moving image is taken and a button manipulated when a still image is taken. As shown in FIG. 2, a moving image shoot button 22 which is manipulated when a moving image is taken is disposed on the left side with respect to the switch 21 in the drawing. A still image shoot button 23 which is manipulated when a still image is taken is disposed on the upper side with respect to the switch 21 in the drawing.

As described above, the image processing apparatus 11 is configured to have the switch 21 which switches the modes, the moving image shoot button 22, and the still image shoot button 23. In addition, in the appearance configuration of the image processing apparatus 11 shown in FIG. 2, the parts necessary for the description below are shown and described, but the image processing apparatus 11 is provided with the following elements on the side surfaces and the other surfaces thereof, neither shown nor described: a lens which takes a subject, a display part which displays information and an image for a user, and other elements.

FIG. 3 shows a diagram depicting an exemplary internal configuration of the image processing apparatus 11. The image processing apparatus 11 is mounted with a recording medium 41 which stores a taken moving image or a still image and is detachable from the image processing apparatus 11. For example, the following is named for the recording medium 41: a magnetic disc (such as a flexible disc), an optical disc (such as a CD-ROM (Compact Disc-Read Only Memory) and a DVD (Digital Versatile Disc)), a magneto-optical disc (such as MD (Mini-Disc) ®), a semiconductor memory (such as Memory Stick ®), etc.

A medium read/write part 51 writes data to the recording medium 41, and reads data out of the recording medium 41. Data written to the recording medium 41 by the medium read/write part 51 is data related to a taken moving image or a still image taken by a shooting part 52. The shooting part 52 is configured to include a lens, a drive part which drives the lens (both not shown) and other elements.

A signal of an image taken by the shooting part 52 is supplied to an input/output signal processing part 53. More specifically, the shooting part 52 converts outside visual information to an image signal, and supplies the image signal to the input/output signal processing part 53. The input/output signal processing part 53 supplies the signal of a moving image from the shooting part 52 and the signal of a still image to an encoding/decoding part 54. When a signal is supplied from the input/output signal processing part 53, the encoding/decoding part 54 encodes the supplied signal in a predetermined encoding mode. For example, a predetermined encoding mode is the MPEG (Moving Picture Expert Group) mode in the case of the moving image signal, and it is the JPEG (Joint Photographic Experts Group) mode in the case of the still image signal.

When the supplied signal is a moving image signal, the encoding/decoding part 54 encodes it to a video stream and an audio stream in a predetermined encoding mode, and further multiplexes the streams to create a data stream. In addition, when the supplied signal is a still image signal, the encoding/decoding part 54 creates still image data encoded in a predetermined mode.

Moving image data and still image data created by the encoding/decoding part 54 are supplied to a recording/playback work memory 55. The recording/playback work memory 55 is a storage part which temporarily (as necessary) holds moving image data and still image data to be supplied to the medium read/write part 51 (to be written to the recording medium 41). The date held in the recording/playback work memory 55 is supplied to the medium read/write part 51, and written to the recording medium 41.

When data written on the recording medium 41 is played back, data is read out of the recording medium 41 by the medium read/write part 51. The data to be read out is moving image data or still image data corresponding to a moving image or a still image specified by a user. The data read by the medium read/write part 51 is supplied to the recording/playback work memory 55. The data held in the recording/playback work memory 55 is supplied to the encoding/decoding part 54.

When the data to be supplied to the encoding/decoding part 54 is moving image data, the moving image data is a video stream and an audio stream that are encoded and multiplexed in a predetermined encoding mode (for example, MPEG). When the data to be supplied to the encoding/decoding part 54 is still image data, the still image data is data that is encoded in a predetermined encoding mode (for example, JPEG).

When moving image data is supplied, the encoding/decoding part 54 separates a video stream from an audio stream in the moving image data (a data stream), and decodes the streams in a predetermined decoding mode.

The signals of the decoded stream are individually supplied to the input/output signal processing part 53. When still image data is supplied, the encoding/decoding part 54 decodes the still image data in a predetermined decoding mode. The decoded signal of the still image is supplied to the input/output signal processing part 53.

The moving image signal (the signal of the decoded video stream) or the still image signal supplied to the input/output signal processing part 53 is supplied to a display part 56. The display part 56 displays an image based on supplied signal of the moving image or the still image signal. For example, the display part 56 is configured of an LCD (Liquid Crystal Display), etc. In addition, not shown in FIG. 3, a device to make sounds such as a speaker is also disposed, and the signal of the decoded audio stream supplied to the input/output signal processing part 53 is supplied to the speaker.

The image processing apparatus 11 includes the switch 21, the moving image shoot button 22, the still image shoot button 23, and also includes a manipulating part 57 which is manipulated by a user and accepts an instruction by the user.

A recording/playback control part 58 controls the encoding process and the decoding process in the encoding/decoding part 54, and the data read/write process for data from the recording medium 41 by the medium read/write part 51. The recording/playback control part 58 is configured of a processor 59, an input/output interface 60, a ROM (Read Only Memory) 61, and a RAM (Random Access Memory) 62. The individual parts in the recording/playback control part 58 are connected to each other via a bus, and are configured to send and receive data to each other.

As described later with reference to a flow chart, for example, the processor 59 controls the preparation and start of the encoding process by the encoding/decoding part 54. In addition, the processor 59 also controls signal input/output in the input/output signal processing part 53 and display of the display part 56. Furthermore, the processor 59 also controls data read and write from the recording medium 41 by the medium read/write part 51.

The input/output interface 60 is disposed to exchange data with external devices. For example, it has a function to connect to a network such that it downloads data managed by an external computer.

The ROM 61 is a memory which holds a program run by the processor 59 and various parameters. For example, the ROM 61 is configured of an EEPROM (Electrically Erasable and Programmable ROM) such as a flash memory.

The RAM 62 is a memory which holds work data necessary to run a program by the processor 59. For example, the RAM 62 is configured of an SRAM (Static RAM) or a DRAM (Dynamic RAM).

Operation of the Image Processing Apparatus

Next, the operation of the image processing apparatus 11 having the internal configuration shown in FIG. 3 will be described. In addition, in the description below, the operation when the moving image or the still image is taken, particularly, mode transition such as the moving image mode and the still image mode will be described. As described above, as the modes, the image processing apparatus 11 has the moving image shooting mode of taking a moving image, the still image shooting mode of taking a still image, and the playback mode of playing back the recorded moving image or the still image.

In addition, when the mode is in any one of the modes described above, the power source of the image processing apparatus 11 is on. When the mode is not in any one of the modes described above, the power source of the image processing apparatus 11 is off. In the description below, it is properly referred to as an off mode.

The off mode, the moving image shooting mode, the still image shooting mode, and the playback mode are generally switched by the switch 21. More specifically, every time when the switch 21 is manipulated, the modes are in turn switched (changed) in this order, for example, the off mode, the moving image shooting mode, the still image shooting mode, and the playback mode.

Figure 4:
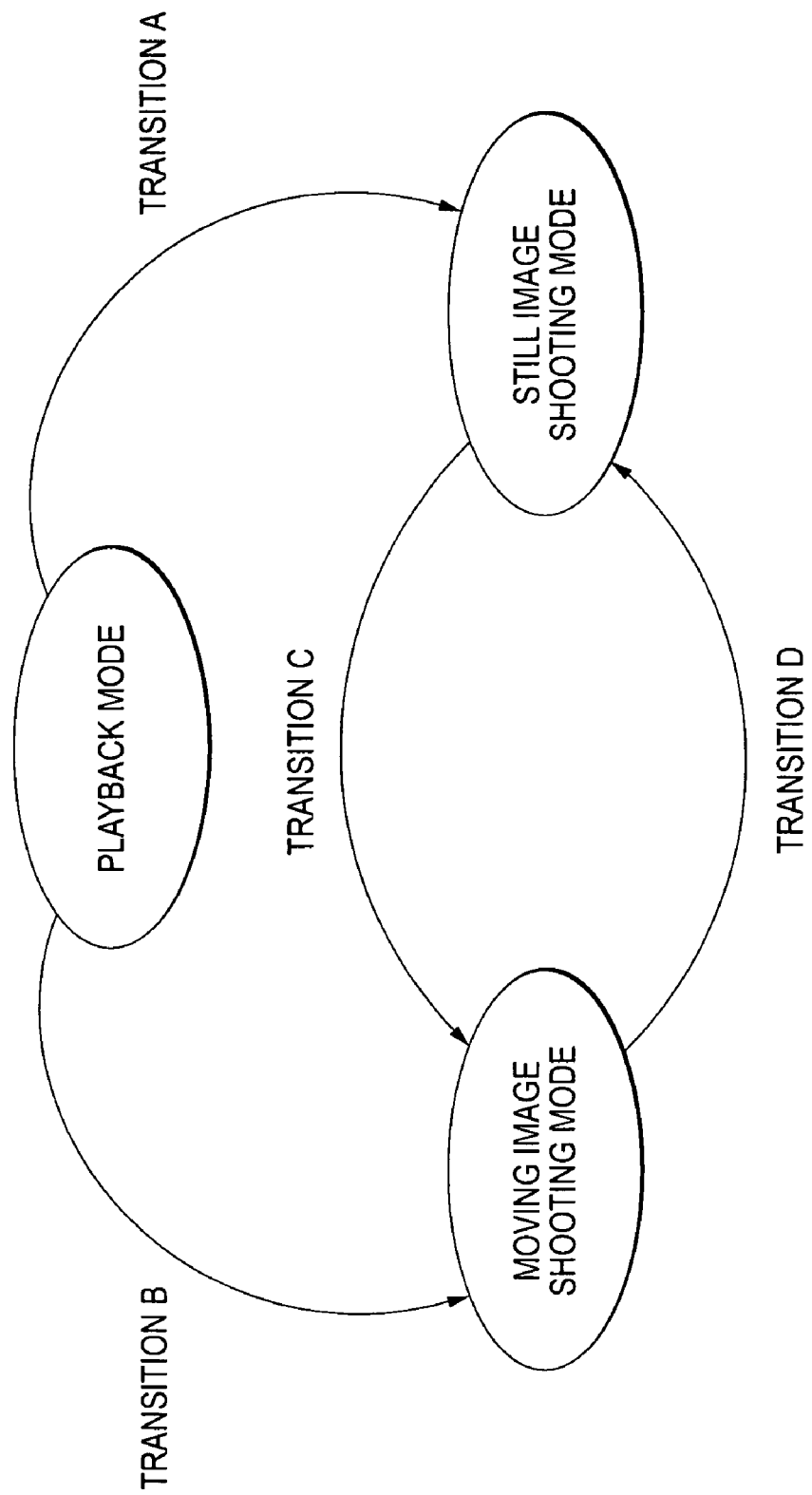
FIG. 4 shows a diagram illustrative of mode transition.
Figure 5:
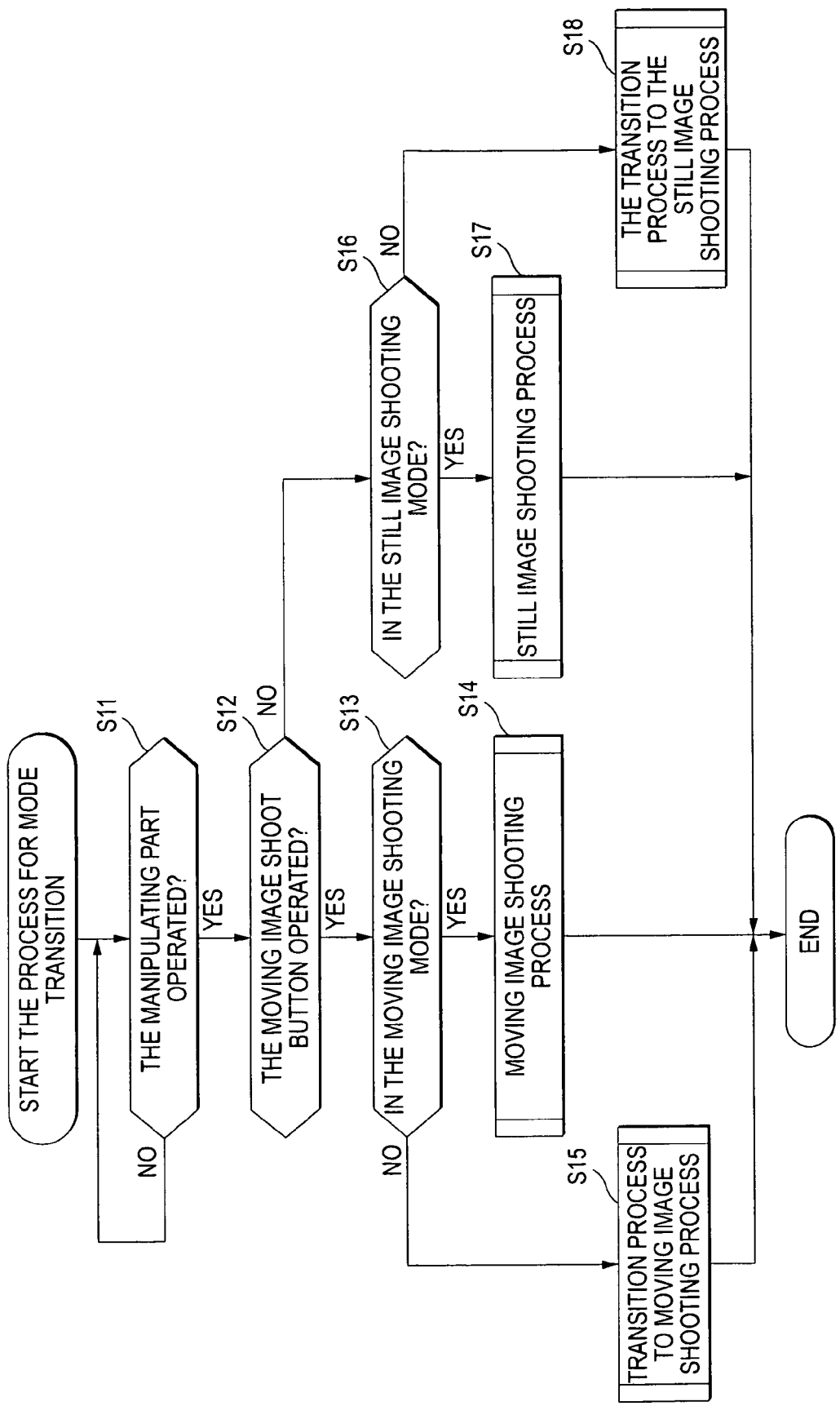
FIG. 5 shows a flow chart depicting the operation of the image processing apparatus.

In the embodiment, the apparatus is configured to switch the modes not only by manipulating the switch 21 but also by manipulating the moving image shoot button 22 or the still image shoot button 23. The mode transition in the embodiment will be described with reference to FIG. 4.

When the still image shoot button 23 (FIG. 2) is manipulated in the playback mode, the mode is changed to the still image shooting mode (transition A). When the moving image shoot button 22 (FIG. 2) is manipulated in the playback mode, the mode is changed to the moving image shooting mode (transition B). When the moving image shoot button 22 (FIG. 2) is manipulated in the still image shooting mode, the mode is changed to the moving image shooting mode (transition C). When the still image shoot button 23 (FIG. 2) is manipulated in the moving image shooting mode, the mode is changed to the still image shooting mode (transition D).

As described above, the image processing apparatus 11 is configured in which when the moving image shoot button 22 or the still image shoot button 23 is manipulated, the mode is changed to the mode corresponding to the manipulated button regardless of the mode at that time. More specifically, a user can switch the modes without manipulating the switch 21. With this configuration, the following advantages can be expected.

Figure 1A:
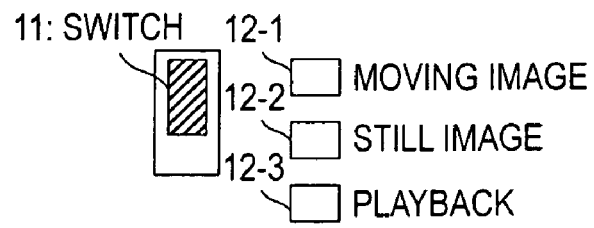
FIGS. 1A and 1B show diagrams illustrative of the configuration of a switch.
Figure 1B:
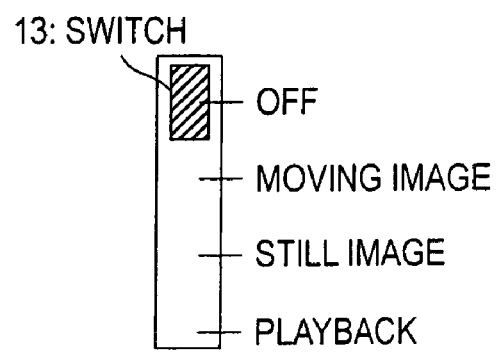

Heretofore, for example, the modes are switched by manipulating the switch 11 shown in FIG. 1A. It is configured in which the modes are in turn switched from the off mode to the moving image shooting mode, and to the still image shooting mode in accordance with the number of manipulations of the switch 11. Therefore, for example, when a user desires to take a still image in the playback mode, it is necessary for the user to manipulate the switch 11 to in turn switch the mode from the off mode, to the moving image shooting mode, and to the still image shooting mode.

In addition, in this mode switching, the user has to confirm which one of the LCDs 12-1 to 12-3 (FIG. 1A) illuminates and to switch the mode to the still image shooting mode. However, since the LCD 12 is small, it is sometimes difficult to confirm whether the illuminating LCD 12 is the LCD 12 that illuminates in the still image shooting mode. For example, the user might make a wrong decision that the LCD 12-2 to illuminate in the still image shooting mode illuminates in spite of the LCD 12-1 that illuminates in the moving image shooting mode. Then, even though the user manipulates the still image shoot button 23 for taking a still image in that wrong state (in the moving image shooting mode), a still image may not be taken. Consequently, the user may not take a still image.

In addition, even though a user desires to take a still image and correctly sets the mode to the still image shooting mode, the user has to do a series of manipulations for setting in such a way that the user manipulates the switch 21 and correctly determines which one of the LCDs 12 illuminates as described above. The user might miss a shutter chance while he/she is manipulating the switch (the user fails to take a still image that the user desires).

However, the embodiment is adapted to provide solutions for such the case that a user makes a quick decision of taking a still image in the playback mode. More specifically, for example, when a user desires to take a still image, the user simply manipulates the still image shoot button 23 to change the mode in the image processing apparatus 11 to the still image shooting mode and the mode is turned to the state to take a still image with no need to confirm the mode in the image processing apparatus 11 at the time when the user desires to take the still image, and with no need to manipulate the switch 11.

It is the same when a user desires to take a moving image.

Accordingly, according to the image processing apparatus 11 to which the embodiment is adapted, a user can switch the modes easily. In addition, since the modes can be switched easily, the user can take an image without missing the desired moment of taking an image regardless of the case of a still image or a moving image.

Next, the operation of the image processing apparatus 11 which allows mode switching (transition) like this will be described with reference to flow charts shown in FIGS. 5 to 9. In addition, the operation of the image processing apparatus 11 described below is the operation that is performed other than in the off mode, that is, when the image processing apparatus 11 is set in any one of the moving image shooting mode, the still image shooting mode, and the playback mode.

This operation can be done in the off mode as well. However, as described later, for example, since the moving image shoot button 22 (FIG. 2) is manipulated to change the mode to the moving image shooting mode, the moving image shoot button 22 is manipulated in the off mode against user's will. Thus, this event might happen that a moving image is taken. On this account, with the provision of a scheme to prevent from this event occurring, the off mode may be included in the mode transition described below.

In addition, the operation of the image processing apparatus 11 described below is the operation when any one of the moving image shoot button 22 and the still image shoot button 23 are manipulated (both are shown in FIG. 2). Since processes when other buttons (not shown) are manipulated (the buttons configure the manipulating part 57 and are manipulating members other than the moving image shoot button 22 and the still image shoot button 23) are not relevant directly to the embodiment, the descriptions are omitted.

At Step S11, the processor 59 (FIG. 3) determines whether the manipulating part 57 is manipulated. At Step S11, the standby state is maintained until it is determined that the manipulating part 57 is manipulated. Then, at Step S11, when it is determined that the manipulating part 57 is manipulated, in other words, when it is determined that some signal is supplied to the processor 59 from the manipulating part 57, the process goes to Step S12.

At Step S12, it is determined whether the moving image shoot button 22 (FIG. 2) has been manipulated. The processor 59 analyzes the signal supplied from the manipulating part 57, and determines that which button is manipulated. At Step S12, when it is determined that the moving image shoot button 22 has been manipulated in the manipulating part 57, the process goes to Step S13.

At Step S13, it is determined whether the mode in the image processing apparatus 11 is set in the moving image shooting mode. Being set in the moving image shooting mode means that it is set in the mode suitable for moving image shooting, for example, the pixel number of a picture device (not shown) configuring the shooting part 52 is set to the pixel number in taking a moving image, the encoding mode of the encoding/decoding part 54 is set in the mode to encode a moving image (for example, MPEG), and so on.

At Step S13, when it is determined that the mode in the image processing apparatus 11 is set in the moving image shooting mode, in other words, when it is determined that the apparatus is ready for moving image shooting (it is in the standby state for moving image shooting), the process goes to Step S14. At Step S14, a moving image shooting process is performed. The moving image shooting process done at Step S14 will be described later with reference to a flow chart shown in FIG. 6.

On the other hand, at Step S13, when it is determined that the mode in the image processing apparatus 11 is not set in the moving image shooting mode, in other words, when it is determined that the mode in the apparatus is set in the still image shooting mode or the playback mode, the process goes to Step S15. At Step S15, a transition process to the moving image shooting mode is performed. The transition process to the moving image shooting mode done at Step S15 means the process that each part in the image processing apparatus 11 is set suitably for moving image shooting (settings as described above). The transition process to the moving image shooting mode done at Step S15 will be described later with reference to a flow chart shown in FIG. 7.

On the other hand, at Step S12, when it is determined that the moving image shoot button 22 (FIG. 2) has not been manipulated among the buttons configuring the manipulating part 57 (FIG. 3), the process goes to Step S16. The process goes to Step S16 when the still image shoot button 23 is manipulated.

At Step S16, it is determined whether the mode in the image processing apparatus 11 is set in the still image shooting mode. Being set in the still image shooting mode means that it is set in the mode suitable for still image shooting, for example, the pixel number of a picture device (not shown) configuring the shooting part 52 is set to the pixel number in taking a still image shooting, the encoding mode of the encoding/decoding part 54 is set in the mode to encode a still image (for example, JPEG), and so on.

At Step S16, when it is determined that the mode in the image processing apparatus 11 is set in the still image shooting mode, in other words, when it is determined that the apparatus is ready for still image shooting (it is in the standby state for still image shooting), the process goes to Step S17. At Step S17, a still image shooting process is performed. The still image shooting process done at Step S17 will be describe later with reference to a flow chart shown in FIG. 8.

On the other hand, at Step S16, when it is determined that the mode in the image processing apparatus 11 is not set in the still image shooting mode, in other words, when it is determined that the mode in the apparatus is set in the moving image shooting mode or the playback mode, the process goes to Step S18. At Step S18, the transition process to the still image shooting mode is performed. The transition process to the still image shooting mode done at Step S18 means the process that each part in the image processing apparatus 11 is set suitably for still image shooting (settings as described above). The transition process to the still image shooting mode done at Step S18 will be describe later with reference to a flow chart shown in FIG. 9.

The moving image shooting process done at Step S14 will be described with reference to a flow chart shown in FIG. 6. The moving image shooting process shown in the flow chart in FIG. 6 is run when the moving image shoot button 22 which instructs the start or end of taking a moving image is manipulated and the mode is set in the moving image shooting mode (in the standby state for moving image shooting) at the time when that manipulation is done.

At Step S31, the processor 59 instructs the encoding/decoding part 54 to start encoding the moving image signal supplied from the input/output signal processing part 53 in a preset moving image encoding mode. With this instruction, the encoding/decoding part 54 encodes the supplied moving image signal in a predetermined mode (for example, MPEG). In addition, the moving image data encoded by the encoding/decoding part 54 is in turn supplied to the medium read/write part 51 via the recording/playback work memory 55.

At Step S32, the medium read/write part 51 writes the supplied moving image data to the recording medium 41 via the recording/playback work memory 55. In this manner, moving image shooting and recording on the recording medium 41 are done.

Next, the transition process to the moving image shooting mode done at Step S15 (FIG. 5) will be described with reference to the flow chart shown in FIG. 7. The transition process to the moving image shooting mode shown in the flow chart in FIG. 7 is run when the moving image shoot button 22 which instructs the start or end of taking a moving image is manipulated and the mode is set in the still image shooting mode or the playback mode different from the moving image shooting mode (the mode is not in the standby state for moving image shooting).

At Step S51, the processor 59 displays the screen for the moving image shooting mode on the display part 56 (FIG. 2). The screen for the moving image shooting mode means characters and icons that are displayed on the display part 56 in the moving image shooting mode.

At Step S52, the processor 59 sets the shooting part 52 to the state optimum for taking a moving image. For example, the angle of view of the shooting part 52 is adjusted (the pixel number of a device configuring the shooting part 52 (such as a CCD and a CMOS) is set to a value (range) in taking a moving image). For example, generally, the pixel number in taking a moving image is smaller than the pixel number in taking a still image. Thus, when the mode is in the still image shooting mode at the time when the process is run (at the time when the process shown in the flow chart in FIG. 7 is started (hereinafter, as similar thereto)), such a process is done that the pixel number in taking a still image is changed to the pixel number in taking a moving image. In addition, when the mode is set in the playback mode when the process is run, such a process is done that the shooting part 52 is activated (in the operable state) to set the pixel number in taking a moving image.

At Step S53, the processor 59 sets the input/output signal processing part 53 to the state to wait an input of from the moving image signal from the shooting part 52. When the mode is set in the still image shooting mode at the time when the process is run, the input/output processing part 53 is in the state to wait an input of from the still image signal from the shooting part 52 (it is in the state to capture a still image). Thus, the mode is switched from that state to the state to wait an input of from the moving image signal continuously inputted. In addition, when the mode is set in the playback mode when the process is run, the input/output signal processing part 53 is in the state to supply the moving image signal or the still image signal supplied from the encoding/decoding part 54 to the display part 56. Thus, the mode is switched from that state to the state supply the moving image signal from the shooting part 52 to the encoding/decoding part 54.

At Step S54, the processor 59 sets the encoding/decoding part 54 to the state to encode the moving image signal supplied from the input/output signal processing part 53 in the encoding mode that is set as the encoding mode for a moving image. When the mode is set in the still image shooting mode at the time when the process is run, the encoding/decoding part 54 is again set to the encoding mode for a moving image signal because it has been set in the encoding mode for a still image signal. In addition, when the mode is set in the playback mode at the time when the process is run, the encoding/decoding part 54 is set to decode data from the recording/playback work memory 55. Thus, the setting is changed to the setting to encode the moving image signal.

At Step S55, the medium read/write part 51 is set to the state to write data on the recording medium 41. When the mode is set in the still image shooting mode at the time when the process is run, the state to write data on the recording medium 41 is maintained (however, the mode is again set to write moving image data, not still image data). When the mode is set in the playback mode at the time when the process is run, the medium read/write part 51 is in the state in which it is reading data out of the recording medium 41. Thus, that read process cancelled, and the mode is switched to the state to run the write process.

As described above, when the moving image shoot button 22 is manipulated, the mode is changed from the other mode to the state to take and record a moving image (the moving image shooting mode). As described above, after the mode is changed in the state to take and record a moving image, a user again manipulates the moving image shoot button 22 to start taking and recording a moving image.

In addition, here, it is supposed that when the moving image shoot button 22 is manipulated in the mode other than the moving image shooting mode, the mode is changed to the moving image shooting mode (the mode is changed to the standby state for moving image shooting). However, this scheme may be done in which the mode is changed to the moving image shooting mode and then shooting is started. To start shooting means that the process shown in the flow chart in FIG. 6, already described, is run. More specifically, this scheme may be done in which the process at Step S55 is ended to change the mode to the mode for moving image shooting and then the processes at Steps S31 and S32 are done subsequently.

Next, the still image shooting process done at Step S17 (FIG. 5) will be described with reference to the flow chart shown in FIG. 8. The still image shooting process shown in the flow chart in FIG. 8 is run when the mode is set in the still image shooting mode at the time when the still image shoot button 23 which instructs taking a still image is manipulated and that manipulation is done (in the standby state for still image shooting).

At Step S71, the input/output signal processing part 53 captures an image signal supplied from the shooting part 52. The image signal to be captured is the image signal supplied from the shooting part 52 when the still image shoot button 23 is manipulated. The captured image signal is supplied to the encoding/decoding part 54. At Step S72, the encoding/decoding part 54 encodes the supplied image signal in a preset encoding mode for a still image (for example, JPEG).

At Step S73, it is determined whether encoding is finished at the encoding/decoding part 54. At Step S73, the process at Step S73 is repeated until it is determined that encoding is finished at the encoding/decoding part 54, that is, until the encoding/decoding part 54 finishes encoding. When it is determined that encoding is finished, the process goes to Step S74.

At Step S74, the still image data encoded at the encoding/decoding part 54 is supplied to the medium read/write part 51 via the recording/playback work memory 55, and written to the recording medium 41. As described above, taking a still image and recording the data of the taken still image on the recording medium 41 are performed.

Next, the transition process to the still image shooting mode done at Step S18 (FIG. 5) will be described with reference to the flow chart FIG. 9. The transition process to the still image shooting mode shown in the flow chart in FIG. 9 is run when the mode is set in the moving image shooting mode or the playback mode that is different from the still image shooting mode at the time when the still image shoot button 23 which instructs taking a still image is manipulated and that manipulation is done (the mode is not in the standby state for still image shooting).

At Step S91, the processor 59 displays the screen for the still image shooting mode on the display part 56 (FIG. 2). The screen for the still image shooting mode means characters and icons that are displayed on the display part 56 in the still image shooting mode.

At Step S92, the processor 59 sets the shooting part 52 to the state optimum for taking a still image. For example, the angle of view of the shooting part 52 is adjusted (the pixel number of a device configuring the shooting part 52 (such as a CCD and a CMOS) is set to a value (range) in taking a still image). For example, generally, the pixel number in taking a still image is greater than the pixel number in taking a moving image. Thus, when the mode is in the moving image shooting mode at the time when the process is run (at the time when the process shown in the flow chart in FIG. 9 (hereinafter, as similar thereto)), such a process is done that the pixel number in taking a moving image is changed to the pixel number in taking a still image. In addition, when the mode is set in the playback mode when the process is run, such a process is done that the shooting part 52 is activated (in the operable state) to set the pixel number in taking a still image.

At Step S93, the processor 59 sets the input/output signal processing part 53 to the state to wait an input of a still image signal from the shooting part 52 (the state to capture the signal). When the mode is set in the moving image shooting mode at the time when the process is run, the input/output processing part 53 is in the state to continuously accept an input of the moving image signal from the shooting part 52, and it is switched from that state to the state to wait an input of the still image signal from the shooting part 52 (the state to capture a still image signal). In addition, when the mode is set in the playback mode at the time when the process is run, the input/output signal processing part 53 is in the state to supply the supplied moving image signal or the still image signal from the encoding/decoding part 54 to the display part 56, and it is switched from that state to the state to supply the supplied still image signal from the shooting part 52 to the encoding/decoding part 54.

At Step S94, the processor 59 sets the encoding/decoding part 54 to the state to encode the still image signal supplied from the input/output signal processing part 53 in the encoding mode that is set as the encoding mode for a still image. When the mode is set in the moving image shooting mode at the time when the process is run, the encoding/decoding part 54 is set in the encoding mode for a moving image signal. Thus, it is again set to the encoding mode for a still image signal. In addition, when the mode is set in the playback mode at the time when the process is run, the encoding/decoding part 54 is set to decode data from the recording/playback work memory 55. Thus, the setting is switched to the setting to encode a still image signal.

At Step S95, the medium read/write part 51 is set to the state to write data on the recording medium 41. When the mode is set in the moving image shooting mode at the time when the process is run, the state is maintained in the state to write data on the recording medium 41 (however, the state is again set to the state to write still image data, not moving image data). When the mode is set in the playback mode at the time when the process is run, the medium read/write part 51 is in the state in which it is reading data out of the recording medium 41. Thus, that read process is cancelled, and the mode is switched to the state to run the write process.

As described above, when the still image shoot button 23 is manipulated, the mode is changed from the other mode to the state to take and record a still image (to the still image shooting mode). As described above, after the mode is turned to the state to take and record a still image, when a user again manipulates the still image shoot button 23, taking and recording a still image is started (done).

In addition, here, it is supposed that when the still image shoot button 23 is manipulated in the mode other than the still image shooting mode, the mode is changed to the still image shooting mode (the mode is changed to the standby state for still image shooting). However, this scheme may be done in which the mode is changed to the still image shooting mode, and then shooting is done. To do shooting means that the process shown in the flow chart in FIG. 8, already described, is performed. More specifically, this scheme may be done in which the process at Step S95 is ended to change the mode to the mode for still image shooting and the processes at Steps S71 to S74 are performed subsequently.

As described above, according to the embodiment, the user can switch the modes not only by manipulating the switch 21 (FIG. 2) but also by manipulating the moving image shoot button 22 or the still image shoot button 23.

As shown in FIG. 2, the moving image shoot button 22 and the still image shoot button 23 are provided at the different positions on the image processing apparatus 11. In addition, among the buttons configuring the manipulating part 57 of the image processing apparatus 11, the moving image shoot button 22 and the still image shoot button 23 are often configured of relatively greater members (greater members than the other buttons) and in a structure to be easily manipulated at the position where a user easily recognizes them. Therefore, the possibility can be considered to be low that a user fails to do correct manipulations, the correct manipulations such that the user manipulates the moving image shoot button 22 when he/she desires to take a moving image whereas the user manipulates the still image shoot button 23 when he/she desires to take a still image (for example, the possibility can be considered to be low that a user manipulates the still image shoot button 23 when he/she desires to take a moving image).

Accordingly, a user manipulates the moving image shoot button 22 when he/she desires to take a moving image, and then the mode is changed to the moving image shooting mode even though the mode at that time is in any modes. Therefore, usability can be improved. To improve usability means that, for example, a user can instantaneously start shooting without consideration of the modes when he/she desires to take a moving image.

Similarly, a user manipulates the still image shoot button 23 when he/she desires to take a still image, and then the mode is changed to the still image shooting mode even though the mode at that time is in any modes. Therefore, usability can be improved. Also in this case, to improve usability means that, for example, a user can instantaneously start shooting without consideration of the modes when he/she desires to take a still image.

As described above, the embodiment of the invention is adapted to improve the usability of the image processing apparatus 11 (an apparatus equipped with the image processing apparatus 11).

In addition, in the embodiment described above, it is described that the modes are changed among the moving image shooting mode, the still image shooting mode, and the playback mode. However, the embodiment of the invention can be adapted to the case in which the modes are changed between two modes among them.

For example, in the case of an apparatus which has the moving image shooting function and the still image shooting function but does not have the function playback, this scheme may be done in which when the mode is set in the moving image shooting mode at the time the moving image shoot button 22 is manipulated, the process shown in the flow chart in FIG. 6 is run, when the mode is set in the still image shooting mode or the playback mode, the process shown in the flow chart in FIG. 7 is run, when the mode is set in the still image shooting mode at the time when the still image shoot button 23 is manipulated, the process shown in the flow chart in FIG. 8 is run, and when the mode is set in the moving image shooting mode or the playback mode; the process shown in the flow chart in FIG. 9 is run.

In addition, for example, in the case of an apparatus which has the moving image shooting function and the playback function but does not have the still image shooting function (therefore, an apparatus not equipped with the still image shoot button 23), this scheme may be done in which when the mode is set in the moving image shooting mode at the time when the moving image shoot button 22 is manipulated, the process shown in the flow chart in FIG. 6 is run, and when the mode is set in the playback/shooting mode, the process shown in the flow chart in FIG. 7 is run.

In addition, for example, in the case of an apparatus which has the still image shooting function and the playback function but does not have the moving image shooting function (therefore, an apparatus not equipped with the moving image shoot button 22), this scheme may be done in which when the mode is set in the still image shooting mode at the time when the still image shoot button 23 is manipulated, the process shown in the flow chart in FIG. 8 is run, and when the mode is set in the playback/shooting mode, the process shown in the flow chart in FIG. 9 is run.

As described above, also in the case of changing between two modes, the embodiment of the invention can be adapted. The embodiment of the invention is adapted to exert the advantages described above, that is, to improve the usability of the image processing apparatus 11 (an apparatus equipped with the image processing apparatus 11).

Recording Medium

A series of processes described above may be run by hardware or by software. When the series of processes are run by software, a program configuring the software is installed from a program storing medium to a computer that is built in hardware for exclusive use, or to a general purpose personal computer that can run various functions by installing various programs.

As shown in FIG. 3, the program storing medium which stores a program that is installed in a computer and is executable by the computer is the recording medium 41 of a package medium configured of a magnetic disc (including a flexible disc), an optical disc (including a CD-ROM (Compact Disc-Read Only Memory), DVD (Digital Versatile Disc)), a magneto-optical disc (including MD (Mini-Disc)), or a semiconductor memory, the ROM 61 in which a program is stored temporarily or permanently, or a storage part (not shown) configured of a hard disc. Storing the program in the program storing medium is done via the input/output interface 60 which is an interface such as a router and a modem or by utilizing a wired or wireless communication medium such as a local area network, the Internet, and digital satellite broadcasting, as necessary.

In addition, in the specification, the steps of describing the program stored in the program storing medium of course include the processes done in a time series in the described order, and also include the processes done in parallel or separately, not necessarily done in a time series.

In addition, the embodiment of the invention is not limited to the embodiment above, which can be modified variously within the scope not deviating from the teachings of the invention.

It should be understood by those skilled in the art that various modifications combinations, sub-combinations and alterations may occur depending on design requirements and other factors insofar as they are within the scope of the appended claims or the equivalents thereof.

The invention claimed is:

1. An image processing apparatus having a moving image shooting mode of operation for taking a moving image, a still image shooting mode of operation for taking a still image, and a playback mode of operation for playing back a moving image or a still image, the apparatus comprising:

a first manipulation module which is manipulated when a moving image is taken;

a second manipulation module which is manipulated when a still image is taken;

a moving image shooting module which starts taking a moving image if the image processing apparatus is in the moving image shooting mode of operation when the first manipulation module is manipulated;

a moving image shooting mode transition module which changes the mode of operation to the moving image shooting mode that can start taking a moving image by the moving image shooting module if the image processing apparatus is in the still image shooting mode of operation or the playback mode of operation when the first manipulation module is manipulated;

a still image shooting module which starts taking a still image if the image processing apparatus is in the still image shooting mode of operation when the second manipulation module is manipulated;

a still image shooting mode transition module which changes the mode of operation to the still image shooting mode that can start taking a still image by the still image shooting module if the image processing apparatus is in the moving image shooting mode of operation or the playback mode of operation when the second manipulation module is manipulated, wherein the first manipulation module and the second manipulation module are disposed at different positions; and a third manipulation module at a position different from the positions of the first manipulation module and the second manipulation module, the third manipulation module being manipulated to switch the moving image shooting mode of operation, the still image shooting mode of operation, and the playback mode of operation.

2. An image processing method of an image processing apparatus having a moving image shooting mode of operation for taking a moving image, a still image shooting mode of operation for taking a still image, and a playback mode of operation for playing back a moving image or a still image, the method comprising:

providing a first manipulation module which is manipulated when a moving image is taken;

providing a second manipulation module which is manipulated when a still image is taken;

taking a moving image if the image processing apparatus is in the moving image shooting-mode of operation when the first manipulation module is manipulated;

changing the mode of operation to the moving image shooting mode that can start taking a moving image if the image processing apparatus is in the still image shooting mode of operation or the playback mode of operation when the first manipulation module is manipulated;

taking a still image if the image processing apparatus is in the still image shooting mode of operation when the second manipulation module is manipulated;

changing the mode of operation to the still image shooting mode that can start taking a still image if the image processing apparatus is in the moving image shooting mode of operation or the playback mode of operation when the second manipulation module is manipulated, wherein the first manipulation module and the second manipulation module are disposed at different positions; and switching the image processing apparatus between the moving image shooting mode of operation, the still image shooting mode of operation, and the playback mode of operation when a third manipulation module of the image processing apparatus is manipulated, wherein the third manipulation module has a position different from the positions of the first manipulation module and the second manipulation module.

3. A computer-readable recording medium having instructions recorded thereon, the instructions being executable by program for a computer to perform a method of controlling which controls an image processing apparatus having a moving image shooting mode of operation for taking a moving image, a still image shooting mode of operation for taking a still image, and a playback mode of operation for playing back a moving image or a still image, the method comprising:

taking a moving image if the image processing apparatus is in the moving image shooting mode of operation when a first manipulation module is manipulated, the first manipulation module being manipulated when a moving image is taken;

changing the mode of operation to the moving image shooting mode that can start taking a moving image if the image processing apparatus is in the still image shooting mode of operation or the playback mode of operation when the first manipulation module is manipulated;

taking a still image if the image processing apparatus is in the still image shooting mode of operation when a second manipulation module is manipulated, the second manipulation module being manipulated when a still image is taken;

changing the mode of operation to the still image shooting mode that can start taking a still image if the image processing apparatus is in the moving image shooting mode of operation or the playback mode of operation when the second manipulation module is manipulated, wherein the first manipulation module and the second manipulation module are disposed at different positions; and switching the image processing apparatus between the moving image shooting mode of operation, the still image shooting mode of operation, and the playback mode of operation when a third manipulation module of the image processing apparatus is manipulated, wherein the third manipulation module has a position different from the positions of the first manipulation module and the second manipulation module.

* * * * *

UNITED STATES PATENT AND TRADEMARK OFFICE
CERTIFICATE OF CORRECTION

PATENT NO. : 7,609,295 B2  
APPLICATION NO. : 11/489970  
DATED : October 27, 2009  
INVENTOR(S) : Kenichiro Aridome and Shinya Kano It is certified that error appears in the above-identified patent and that said Letters Patent is hereby corrected as shown below:

Column 19, line 2, "shooting-mode" should read --shooting mode--.  
Column 19, line 33, delete "program for".  
Column 19, line 34, delete "which controls".

Signed and Sealed this

Thirtieth Day of November, 2010

David J. Kappos  
*Director of the United States Patent and Trademark Office*